United States Patent [19]

Holmes et al.

[11] Patent Number: 4,687,973

[45] Date of Patent: Aug. 18, 1987

[54] DIGITAL WAVEFORM GENERATOR

[75] Inventors: Richard E. Holmes; Joe A. Mays, both of Bellbrook; Michael C. Tyler, Dayton, all of Ohio

[73] Assignee: Electronic Image Systems, Inc., Xenia, Ohio

[21] Appl. No.: 884,138

[22] Filed: Jul. 9, 1986

[51] Int. Cl.$^4$ .............................................. H01J 29/56
[52] U.S. Cl. ..................................... 315/371; 315/368
[58] Field of Search ....................... 315/371, 368, 370

[56] References Cited

U.S. PATENT DOCUMENTS

| | | | |
|---|---|---|---|
| 4,203,051 | 5/1980 | Hallett et al. ....................... | 315/368 |
| 4,203,054 | 5/1980 | Sowter ................................ | 315/368 |
| 4,287,506 | 9/1981 | Richards . | |
| 4,401,922 | 8/1983 | Kamata et al. ..................... | 315/368 |
| 4,472,707 | 9/1984 | Wilensky et al. . | |
| 4,491,926 | 1/1985 | Richards . | |
| 4,620,136 | 10/1986 | Bolger ................................ | 315/368 |

OTHER PUBLICATIONS

Farrell et al, Design Handbook for Imagery Interpretation Equipment, Boeing Aerospace Co., pp. 4.4–23 and 4.4–24, Feb. 1984.

Primary Examiner—Theodore M. Blum
Attorney, Agent, or Firm—Biebel, French & Nauman

[57] ABSTRACT

In a cathode ray tube display system, correction factors for X and Y position, astigmatism, focus and shading are recorded for preselected locations in digital memory circuits. Those correction factors bordering the actual beam position are selected and are converted to analog form. The correction factors applied to the system are determined by analogue interpolation, that is, the correction factors are combined in proportion to the proximity of the beam relative to those preselected locations where the correction factors were recorded. Use is made of resistance ladders and multiplexers in the interpolation circuits.

8 Claims, 10 Drawing Figures

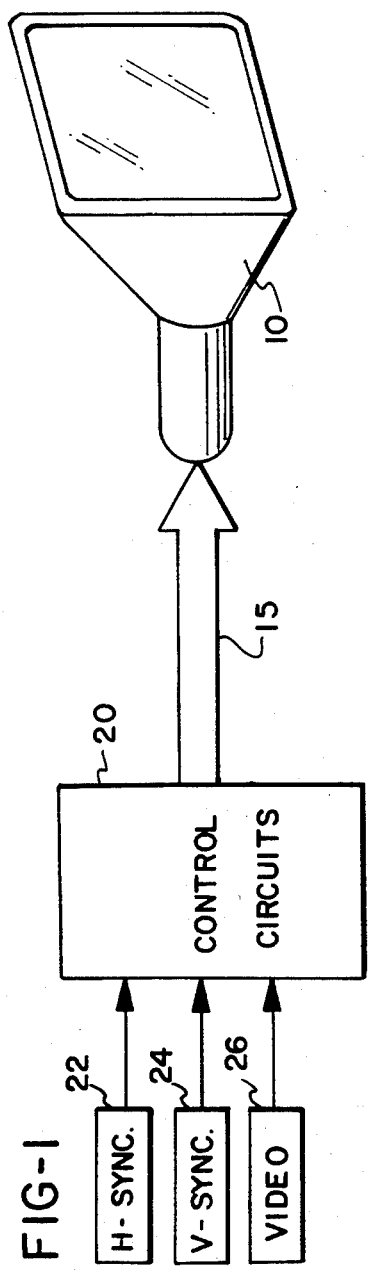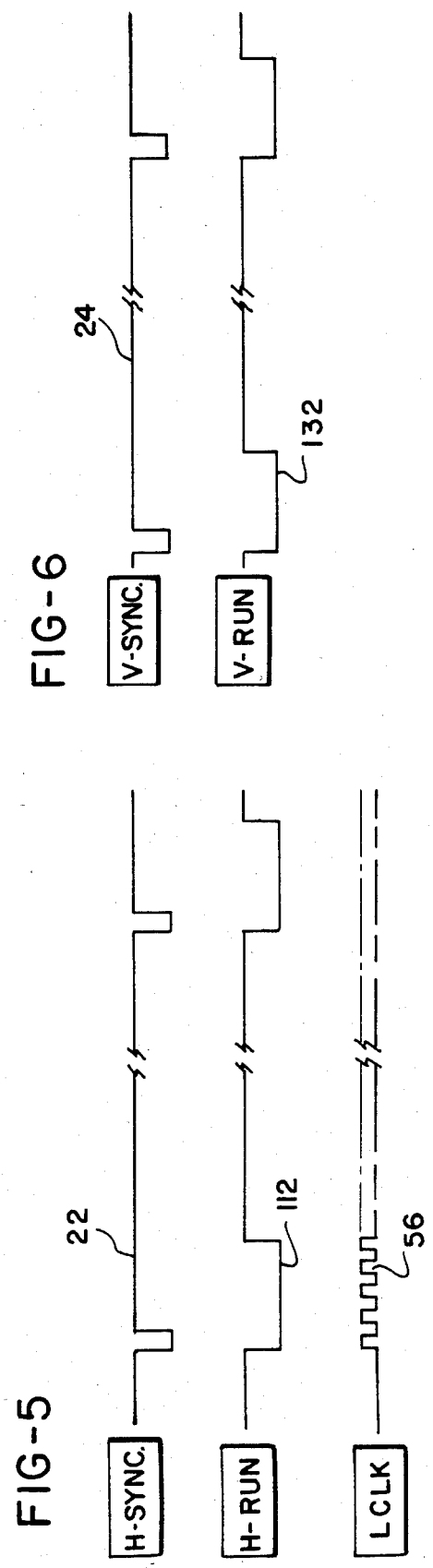

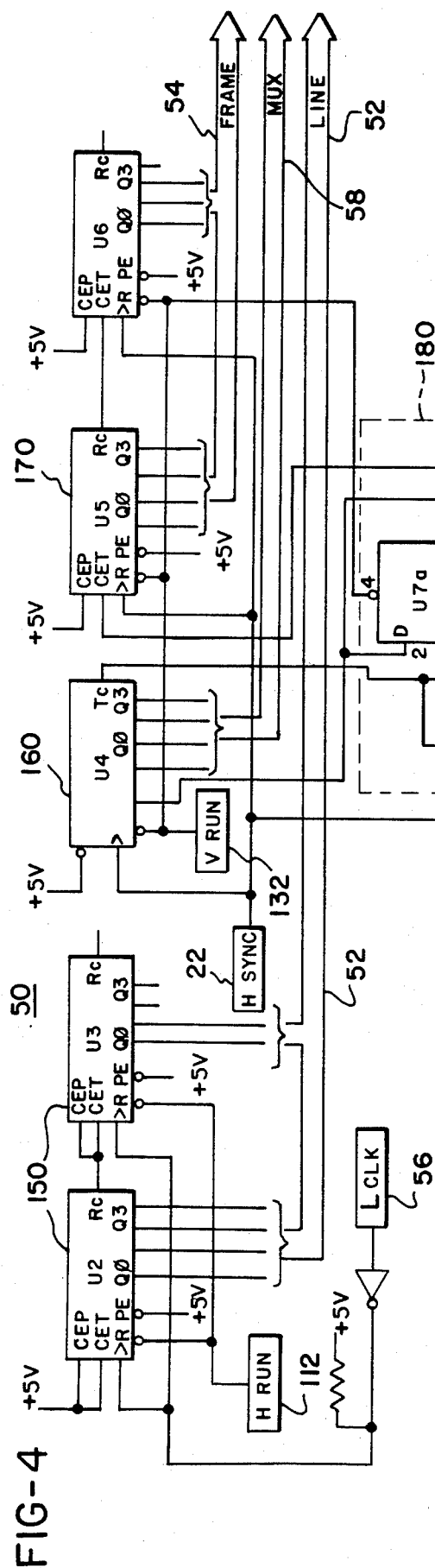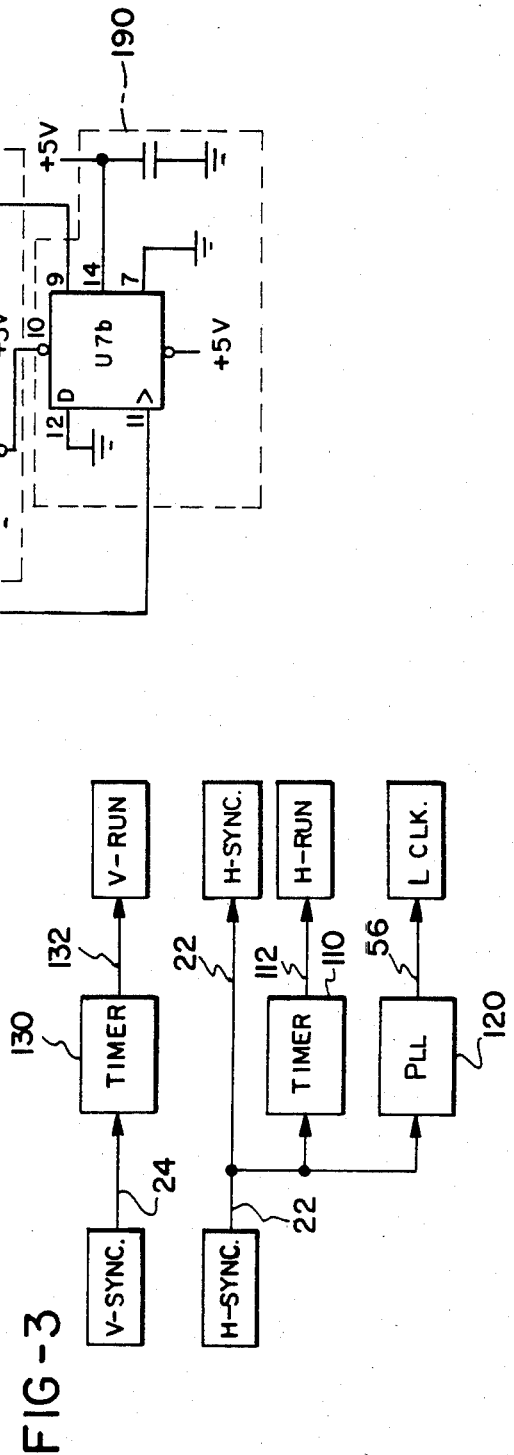

DIGITAL WAVEFORM GENERATOR

BACKGROUND OF THE INVENTION

This invention relates to a method and apparatus for providing correction signals to the beam of a cathode ray tube in proportion to the proximity of the beam relative to those preselected locations where correction factors had been previously recorded.

In a typical cathode ray tube (CRT) display system, correction signals are required if the size and shape of the beam is to remain constant as the beam is moved on the face of the CRT, independent of the location of the beam. This is particularly important in high resolution systems. Among the correction factors normally applied are focus, X and Y position corrections, astigmatism, and shading.

Traditionally, analog waveform generation is used in a horizontal (X) and vertical (Y) raster CRT display to provide spot size correction such as dynamic focus (a function that lies between $X^2+Y^2$ and the square root of $(X^2+Y^2)$ or to provide geometrical correction such as $X^2Y$ and $Y^2X$ for pincushion correction, etc. For example, one such system is described in an article entitled "Dual Mode Calligraphic/Raster Color Cathode Ray Tube (CRT) Projector" by Richard E. Holmes in *Proceedings of the Society of Photo-Optical Instrumentation Engineers*, Vol. 386, January, 1983.

These corrections are mathematically derived approximations of the desired correction waveforms. In reality higher order terms than typically used are needed, but they are not practical to implement. Higher resolution monochrome displays may need dynamic astigmatism correction as well as focus and geometry correction. Color displays need dynamic convergence correction such as red, green, blue and blue lateral correction. Basically, though, the waveform generator can be considered as a device which generates a unique Z (magnitude) output for every X and Y location on the display.

Attempts have been made to use digital correction in the past. The article entitled "Twenty-Five-Inch Precision Color Display for Simulator Visual Systems" by R. E. Holmes and J. A. Mays in *Optical Engineer*, Vol. 18, No. 6, November-December 1979, pp. 630–633, describes a technique of combining analog circuitry with two dimensional digital correction using a checker board approach where the value for the vertical (Y) direction remained the same for several scan lines. Smoothing between digital points was achieved in the X direction by means of analog filtering which kept the number of values saved in digital memory for this dimension within practical limits. In the vertical direction, the concept became impractical because so many scan lines of values are needed that memory size becomes excessive. If too few scan lines of vertical correction data are used, a basketweave pattern will appear on the screen due to discontinuity that appears at each boundary of the checker board pattern. What is needed is a practical means to provide vertical (Y) smoothing, and the present invention fulfills that need.

In one embodiment of the present invention, two sets of electronically programmable read-only memories (EPROMs) are used to store a 40×80 element digital representation of the correction waveforms which would be suitable for a 1280×1280 picture element video display. Smoothing for the 40 element representation of the 1280 horizontal components is still done by analog means, mainly by taking advantage of the inductances of the deflection, focus, astigmatism and convergence coils of magnetically focused and deflected displays. For electrostatic displays, resistive, inductive, capacitive or active filtering, well known in the art, can be used to perform this function.

The data in the two sets of EPROMs are identical but shifted by one block. For example, one EPROM holds correction data for lines 0, 16, 32, ..., 1248 and 1264 while the other EPROM holds correction data for lines 16, 32, 48, ..., 1264 and 1280. The same functions might be implemented with only one EPROM if the data from it is digitally time multiplexed into two separate latches.

For one sequence of 16 scan lines, the first EPROM generates 40 different digital values representing the actual values that should exist along the top scan line. Simultaneously, the other EPROM generates 40 different digital values representing the actual value that should exist along the scan line n+16. For equivalent X direction points along Y direction lines n+1, n+2, ... n+16, a good estimate value would be the linear weighted average. For instance, the smoothed value for line n+4 would be (n+4) where:

$$(n+4)=[(n+16)-(n)]4/16+(n).$$

The system is not limited to a raster scan type system. It can also be used with point writing CRT systems where the address for the EPROMs is derived from analog-to-digital (A/D) converters sampling the sweep signals or from those signals used to direct the beam.

In the preferred embodiment of the invention, the digital output from each EPROM is connected to a video digital-to-analog converter, and the outputs from these devices are connected to a resistance ladder across which a fast analog multiplexer selects an interpolated value in accordance with the line being scanned. As an alternative, very fast and not inexpensive digital circuits could be used in place of the resistance ladder and analog multiplexer circuit.

Although the invention is described in connection with a cathode ray tube display system, the technique described is equally usable for any N dimensional waveform generation where linear interpolation is desired for intermediate values of digitally generated numbers.

Accordingly, it is an object of this invention to provide a method in connection with a CRT display system where correction factors for the beam have been recorded in memory for a few preselected positions on the face of the CRT comprising the steps of selecting the location where the beam of the CRT is to be placed, selecting those memory locations containing correction factors pertaining to the selected beam location, determining the relative contribution of the selected memory locations for the selected beam location, and combining the correction factors in accordance with their relative contribution.

It is also an object of this invention to provide an apparatus for providing correction signals to the beam of a CRT in accordance with the location of the beam on the screen, said apparatus comprising memory means, said memory means including memory locations corresponding to a limited number of preselected locations on said screen where correction factors to the characteristics of the beam have been recorded, means for selecting the location where the beam is to be placed, means for selecting those memory locations closest to the beam, and means for combining the correction factors recorded in said selected memory locations in proportion to the proximity of the beam relative to the preselected locations where the correction factors were recorded in said memory means.

It is also an object of this invention to provide a correction circuit that may be used with a point-to-point cathode ray tube display system.

Other objects and advantages of the invention will be apparent from the following description, the accompanying drawings and the appended claims.

DESCRIPTION OF THE DRAWINGS

FIG. 1 is a simplified schematic representation of a CRT display system.

FIG. 3 is a simplified block diagram of a circuit for creating timing signals for use by the counter and correction circuits.

FIG. 4 is a block diagram of the counter circuits used to select the correction factors needed to provide a distortion-free image.

FIG. 5 is a waveform drawing showing the relationship between horizontal sync signals, horizontal run signals and line clock signals.

FIG. 6 is a waveform drawing showing the relationship between the vertical sync signals and the vertical run signal.

DESCRIPTION OF THE PREFERRED EMBODIMENT

Figure 2:
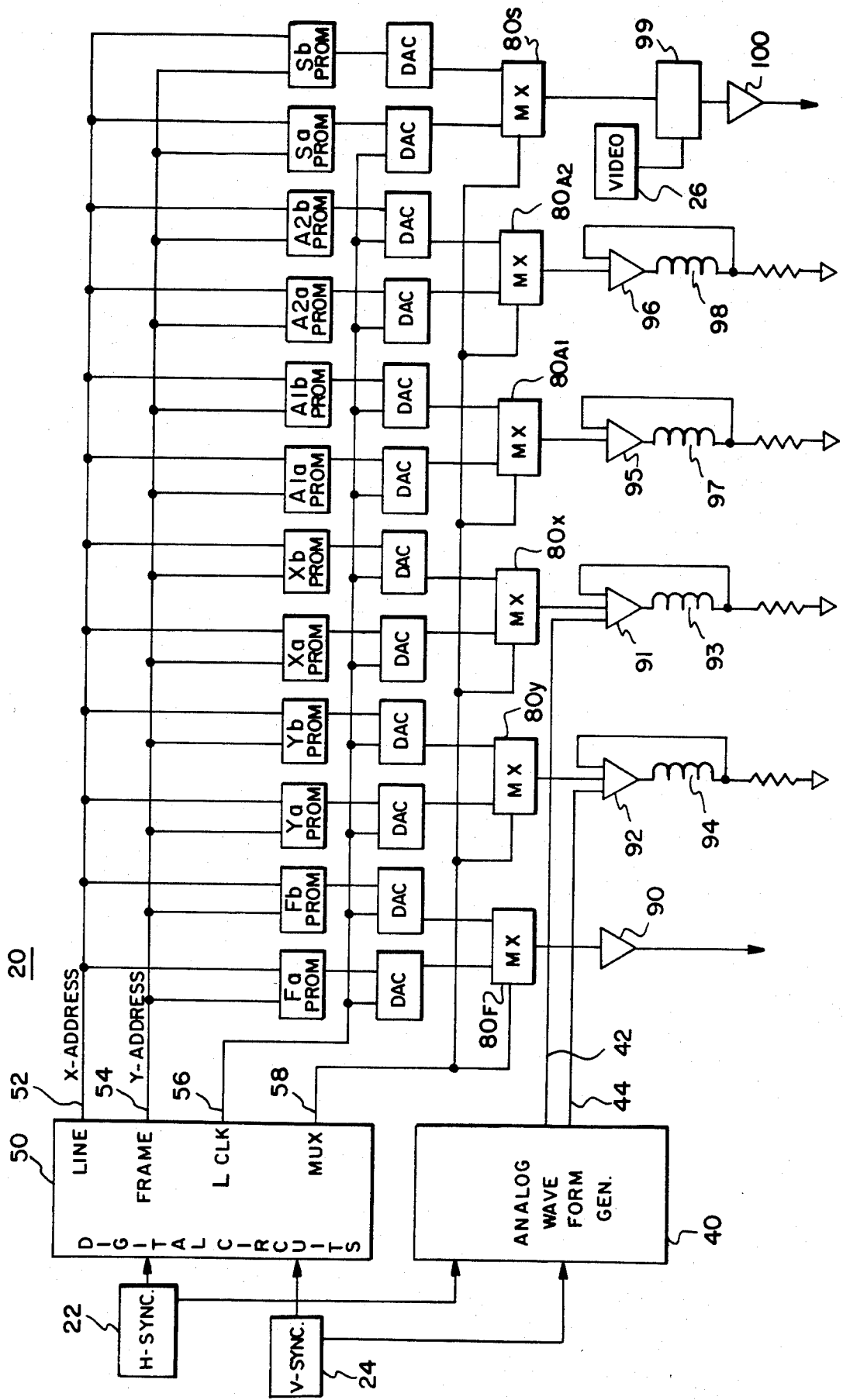
FIG. 2 is a simplified block diagram of a video control circuit for creating an undistorted image on the face of a CRT.

Referring now to the drawings which illustrate a preferred embodiment of this invention, and particularly to FIG. 1, a cathode ray tube (CRT) 10 receives various control and correction signals, such as dynamic focus, dynamic astigmatism and intensity, as well as X and Y deflection signals, on cable 15 from a control circuit shown generally at 20. The control circuit 20 in turn responds to the typical horizontal sync (H SYNC) signals 22, vertical sync (V SYNC) signals 24 and video input signals 26 provided from an external source. While a typical CRT display system, and the one described in connection with this invention, utilizes raster scan techniques, it should be understood that the present invention may be used with both raster scan and point-to-point display systems.

The block diagram of FIG. 2 represents a control circuit 20 that may be used with a raster scan type of CRT display. The circuit 20 includes an analog waveform generator 40 of conventional design responsive to horizontal synchronization (H SYNC) and vertical synchronization (V SYNC) input signals, and it generates appropriate output signals on lines 42 and 44 for controlling the movement and position of the beam on the face of the CRT. The output of the analog waveform generator 40 includes correction signals to compensate for the typical distortions produced by the CRT, such as pincushion, trapezoid distortion, etc. For example, the X position output on line 42 might include the expression $X+(AX+BXY+CXY^2)+D$, while the Y position signal on line 44 might include the expression $Y+(EY+FXY+GYX^2)+H$, where A–H are constants dependent on the CRT used.

The control circuit 20 also includes a digital control circuit 50, also responsive to the H SYNC and V SYNC input signals 22 and 24, for producing output signals which in turn generate control signals for dynamic focus, dynamic astigmatism and shading, as well as further correction signals for the X and Y deflection coils associated with the CRT 10, as will be explained.

The digital control circuit 50 generates X and Y adress signals on lines 52 and 54, a pixel clock or LCLK signal on line 56, and an interpolation address or MUX signal on line 58.

Correction signals for selected locations on the face of the CRT are stored in a battery of twelve memory circuits identified in FIG. 2 generally as programmable read-only memories or PROMs. The specific correction signal selected to be read from a PROM is determined by the X and Y address signals on lines 52 and 54. There are two PROMs for each of the six functions controlled by this circuit, and these are identified generally by the initial letter of the function and suffix "a" or "b." Each PROM is connected to a high speed or video digital-to-analog converter (DAC) 70.

A correction signal is basically a digital or binary number that will be applied to its respective digital-to-analog converter 70 and temporarily stored by the DAC under control of the LCLK signal on line 58. The analog outputs of each pair of DACs are combined by a mulitplexer circuit (MX) 80 which in turn interpolates between the two DAC outputs under the direction of the MUX signal on line 58.

As shown in FIG. 2, PROMs Fa and Fb store the correction signals for focus, PROMs Ya and Yb store correction signals for vertical deflection, PROMs Xa and Xb store the correction factors for horizontal deflection, PROMs A1a and A1b store phase one dynamic astigmatism correction signals, PROMs A2a and A2b store phase two dynamic astigmatism correction signals, and PROMs Sa and Sb store correction signals for shading, or the intensity control for the CRT. Note that the output of the multiplexer 80S associated with the Sa and Sb PROMs is mixed with the video input 26 from the external circuit.

The output of multiplexer 80F is applied through the high voltage electrostatic dynamic focus amplifier 90 to the focus grid of the CRT. The outputs from the X deflection and Y deflection amplifiers 80X and 80Y are applied to the linear X deflection amplifier 91 and the Y linear deflection amplifier 92, respectively, along with the outputs 42 and 44 from the analog waveform generator 40, to the X and Y deflection coils 93 and 94, respectively.

Similarly, the outputs from the dynamic astigmatism multiplexers 80A1 and 80A2 are applied to their respective dynamic astigmatism amplifiers 95 and 96 and from there to astigmatism coils 97 and 98. Finally, the output of the shading multiplexer 80S is mixed with the video input 26 in analog multiplier 99 and high frequency amplifier 100 where it is then applied to the cathode of the CRT.

FIGS. 3 and 4 together show the basic components that make up the digital control circuit 50. The horizontal sync (H SYNC) signal 22 is obtained from the external video synchronization generator and is typically a short (less than one microsecond) pulse that designates the end of a line. This pulse is applied to a timer 110 (FIG. 3), the output of which is a pulse which lasts for the duration of the horizontal blanking interval as illustrated in FIG. 5. The output of the timer on line 112 is called H RUN and is a negative going pulse which will set counter 150 in the circuit of FIG. 4 to zero until the beginning of the next horizontal scan line. Its duration is therefore equal to the line blanking interval.

The H SYNC signal 22 is also applied to a phaselock loop (PLL) circuit 120 whose output on line 56 is a continuous series of pulses at a multiple of the horizontal sync frequency.

The particular frequency used by the PLL 120 is a function of the resolution of the system, for example, 20, 40 or 60 times the H SYNC pulse rate. The output on line 56 is identified as LCLK and is used by the circuits shown both in FIGS. 4 and 7. This signal therefore determines how often a DAC is changed during the interval that a line is being written.

The vertical sync (V SYNC) signal 24 is applied to a timer 130, and its output on line 132 is identified as V RUN. The duration of this output covers the time from the end of the last line until the beginning of the first line of a frame, and is also known as the frame blanking interval. Both the V SYNC and V RUN waveforms are illustrated in FIG. 6. The V RUN signal resets counters 160 and 170 in the circuit of FIG. 4 to zero during the vertical or field retrace interval, and then allows those counters to run when a new frame begins. The V RUN signal also sets 180 so that 160 is in the UP count state.

In FIG. 4, three sets of counters are provided for the selection of the correction factor to be applied to the CRT. Counters U2 and U3 together comprise a first counter means or horizontal address counter 150, the outputs of which supply the X address signals on line 52 (LINE) to the PROMs.

Counter U4 functions as a second counter means or up/down counter 160, and it provides an address signal on line 58 (MUX) to the multiplexers (MX).

Counters U5 and U6 together comprise a third counter means or vertical address counter 170, and their outputs on line 54 (FRAME) supply the Y address signal to the PROMs.

The horizontal address counter 150 (U2-U3) is set to zero by the H RUN signal on line 112. Once the CRT beam has retraced, and the H RUN signal is removed, the counters operate under control of the LCLK input on line 57 and increment one count for each LCLK pulse. The addresses which result from the operation of counter 150 are carried by the line 52, which is actually a cable including at least six wires, to the PROMs storing the correction factors.

Similarly, up/down counter 160 (U4) and vertical address counter 170 (U5-U6) are reset to zero by the V RUN signal on line 132 during the vertical retrace interval. Once the V RUN signal 132 is removed, counters 160 and 170 may begin counting in response to the H SYNC signals on line 22 in accordance with the following scheme.

Counter 160 initially will increment one count for each H SYNC pulse 22 until it reaches a count of 15. At that time, a terminal count (TC) output will be applied to control circuit 180, an output from which will reverse the operation of counter 180 so that it now decrements toward zero. When the counter 160 reaches a terminal count at zero, the circuit 180 will again reverse the direction of the counter. Thus, counter 160 will provide an output on line 58 (MUX), a four conductor cable, that will cycle up and down from between decimal values of 0 and 15.

The terminal count (TC) output from counter 160 is also applied to a control circuit 190 which controls the operation of the Y address counter 170. At each occurrence of a terminal count, that is, when counter 160 reaches either zero or 15, counter 170 is enabled and it will then increment one digit upon the occurrence of the next H SYNC pulse. Thus, the output of the Y address counter 170 on the seven conductors which comprise cable 54 (FRAME) is a Y address signal that changes one count each time fifteen lines have been written on the face of the CRT.

Counters U2, U3, U5 and U6 may be type 74HC161 counters and U4 may be type 74HC191 counters manufactured by National Semiconductor and others. The multivibrators U7a and U7b included in control circuits 180 and 190 may be type 74HC74 devices manufactured by National Semiconductor and others.

Figure 7:
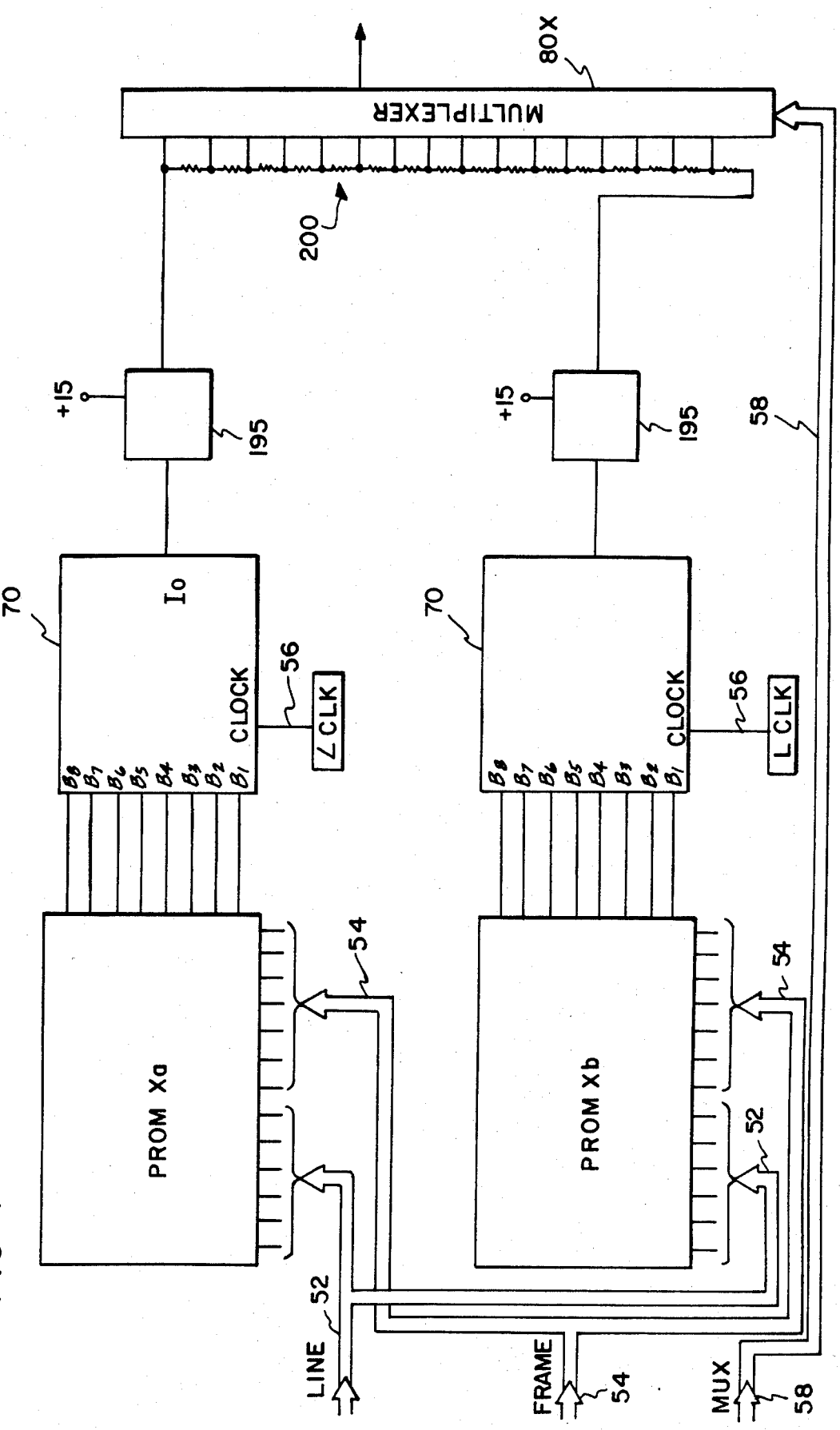
FIG. 7 is a block diagram of a preferred embodiment of a correction circuit.

FIG. 7 is an electrical schematic diagram of a pair of the memory circuits shown in FIG. 2, as for example, the Xa and Xb PROMs that provide correction signals to the horizontal deflection amplifier 92 of the CRT 10. Since it would be both uneconomical and impractical to provide a correction for each pixel on the face of the CRT, correction factors are recorded at regular intervals on the face of the CRT in these PROMs.

For the purposes of illustration, it will be assumed for the present discussion that the PLL 120 interval is set at eight, that is to say, there will be eight points along a single scan line at which correction factors are recorded. It is further assumed that correction factors are recorded on every fifteenth scan line, and that the groups of correction factors for lines 0, 15, 30 and 45 are as follows:

line 0: 10, 20, 30, 40, 50, 60, 70, 80
line 15: 13, 23, 33, 43, 53, 63, 73, 83
line 30: 16, 26, 36, 46, 56, 66, 76, 86
line 45: 19, 29, 39, 49, 59, 69, 79, 89

In accordance with the preferred embodiment of this invention, data will be recorded for these specific lines in the PROMs Xa and Xb in the following manner.
PROM Xa
Set A: 10, 20, 30, 40, 50, 60, 70, 80
Set B: 16, 26, 36, 46, 56, 66, 76, 86
Set C: 16, 26, 36, 46, 56, 66, 76, 86
PROM Xb
Set A: 13, 23, 33, 43, 53, 63, 73, 83
Set B: 13, 23, 33, 43, 53, 63, 73, 83
Set C: 19, 29, 39, 49, 59, 69, 79, 89

Therefore, PROMs Xa and Xb comprise first and second memory means each including groups of memory locations where each group contains the correction factors for preselected locations on a single scan line.

The Y address signals on line 54 select the set of correction factors recorded in the PROMs while the X address signals on line 52 select the specific correction factors along a single line. Thus, the first set (Set A) of correction factors from PROMs Xa and Xb will be selected by the Y address signal while lines 0-14 are being written on the CRT, the second set (Set B) will be selected for lines 15–29, the third set (Set C) will be selected for lines 30–44, etc. Therefore, the group of correction factors closest to the line on which the beam is actually positioned are selected in this way.

Means are provided for combining the correction factors recorded in the memory circuits or PROMs Xa and Xb in proportion to the proximity of the line being scanned by the beam relative to those lines where the groups of correction factors are recorded in the memory means. When line 0 is being scanned, the Set A group of corrections from PROMs Xa and Xb are provided.

The output from each PROM is applied to a high speed video digital-to-analog converter (DAC) 70, such as a type TML1852 video DAC manufactured by Telmos, Inc. of Sunnyvale, Calif. The specific correction factor from each PROM is captured by or latched into its video DAC 70 by the LCLK pulse on line 56, and the analog output from the DAC is applied through an amplifier 195 to one side of a resistance ladder circuit shown generally at 200.

The resistance ladder 200 combines the outputs of the two DACs 70 in accordance with the address signal (MUX) on line 58 provided to the multiplexer 80 by the up/down counter 160. Thus, for line 0, the multiplexer output will allow the correction signals from PROM Xa to pass directly through the multiplexer to the deflection amplifiers; for the next line, 14/15 of the correction signals from PROM Xa and 1/15 from PROM Xb will be applied to the deflection amplifiers, and so forth, as illustrated in the table below.

| Line Number | |
|---|---|
| 0 | 15/15 TOP MEMORY + 0/15 BOTTOM MEMORY |
| 1 | 14/15 TOP MEMORY + 1/15 BOTTOM MEMORY |
| 2 | 13/15 TOP MEMORY + 2/15 BOTTOM MEMORY |
| 3 | 12/15 TOP MEMORY + 3/15 BOTTOM MEMORY |
| . | |
| . | |
| 14 | 1/15 TOP MEMORY + 14/15 BOTTOM MEMORY |
| 15 | 0/15 TOP MEMORY + 15/15 BOTTOM MEMORY |
| 16 | 1/15 TOP MEMORY + 14/15 BOTTOM MEMORY |
| 17 | 2/15 TOP MEMORY + 13/15 BOTTOM MEMORY |
| . | |
| . | |
| 28 | 13/15 TOP MEMORY + 2/15 BOTTOM MEMORY |
| 29 | 14/15 TOP MEMORY + 1/15 BOTTOM MEMORY |
| 30 | 15/15 TOP MEMORY + 0/15 BOTTOM MEMORY |
| 31 | 14/15 TOP MEMORY + 1/15 BOTTOM MEMORY |
| . | |
| . | |

At the beginning of a frame, the horizontal address counter 150, the vertical address counter 170, and the MUX counter 160 (FIG. 4) are set to zero. Therefore, correction signals for the scan lines beginning at the top of the frame in the present example will be generated by PROMs Xa and Xb according to the following sequence.

| Line Number | Correction Factors | | | | | | | |
|---|---|---|---|---|---|---|---|---|
| 0 | 10 | 20 | 30 | 40 | 50 | 60 | 70 | 80 |
| 1 | 10.2 | 20.2 | 30.2 | 40.2 | 50.2 | 60.2 | 70.2 | 80.2 |
| 2 | 10.4 | 20.4 | 30.4 | 40.4 | 50.4 | 60.4 | 70.4 | 80.4 |

-continued

| Line Number | Correction Factors | | | | | | | |
|---|---|---|---|---|---|---|---|---|
| . | | | | | | | | |
| 14 | 12.8 | 22.8 | 32.8 | 42.8 | 52.8 | 62.8 | 72.8 | 82.8 |
| 15 | 13 | 23 | 33 | 43 | 53 | 63 | 73 | 83 |
| 16 | 13.2 | 23.2 | 33.2 | 43.2 | 53.2 | 63.2 | 73.2 | 83.2 |
| . | | | | | | | | |
| . | | | | | | | | |
| 28 | 15.6 | 25.6 | 35.6 | 45.6 | 55.6 | 65.6 | 75.6 | 85.6 |
| 29 | 15.8 | 25.8 | 35.8 | 45.8 | 55.8 | 65.8 | 75.8 | 85.8 |
| 30 | 16 | 26 | 36 | 46 | 56 | 66 | 76 | 86 |
| 31 | 16.2 | 26.2 | 36.2 | 46.2 | 56.2 | 66.2 | 76.2 | 86.2 |
| . | | | | | | | | |
| . | | | | | | | | |
| 43 | 18.6 | 28.6 | 38.6 | 48.6 | 58.6 | 68.6 | 78.6 | 88.6 |
| 44 | 18.8 | 28.8 | 38.8 | 48.8 | 58.8 | 68.8 | 78.8 | 88.8 |
| 45 | 19 | 29 | 39 | 49 | 59 | 69 | 79 | 89 |

Thus, as the lines written on the face of the CRT changes from line 14 to line 15, the Y address signal will change and call for the correction factors provided by the PROMs Xa and Xb to change from the set A values to the set B values. As may be seen from the examples above, under these circumstances, PROM Xb is the active PROM and is primarily responsible for the total correction of the video signal. The output of PROM Xb, however, is made the same for both set A and set B corrections.

The analog output of the video DAC 70 is primarily controlled by the digital input thereto on pins B1–B8. However, even with an identical digital input, the analog outputs from two different DACs can vary. It has found that variations as small as one-sixteenth of a line width in vertical displacement are noticeable on the face of a CRT. Variations in focus, shading, etc. are also noticeable, particularly when the screen is filled with either light or dark lines. To avoid noticeable discontinuities, the correction factors are recorded in the PROMs so that as the sets are changed, as for example, when going from line 14 to line 15 or from line 29 to line 30, the DAC circuit that supplies the high proportion of the MUX output is not changed. This approach reduces the visual evidences of the differences in the response characteristics of the analog devices that convert the digital signals stored in the PROMs onto the screen of the CRT by spreading these effects over 15 lines rather than one line as would otherwise be the case.

A typical video display of the type that would require the use of a high precision correcting circuit such as the type described in this invention would be in the order of from 1280×1280 pixel elements (pixels) to 2048×2048 pixels, and the pixel clock rate in this case would be in the order of 60, that is to say, there would be 60 correction factors read during the writing of each line on the face of the CRT.

In the preferred embodiment of the invention, each of the PROMs may be an 8K by 8 EPROM, type CDM6264 manufactured by RCA. Alternatively, other memory means may be employed, such as conventional dynamic RAMs. These memories could be initialized with the correction data from a magnetic disk when the system is turned on.

Figure 8:
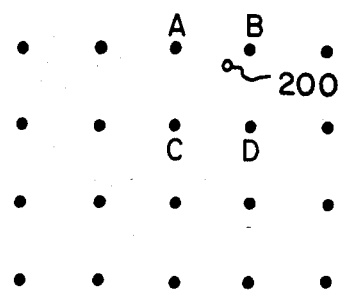
FIG. 8 represents a portion of the face of a CRT showing the current position of the beam with respect to those locations where corrections have been previously recorded.

This invention may also be used with a calligraphic point-to-point display system. Referring to FIG. 8, the current position of the CRT beam is represented by the point 200 located within the selected correction locations identified as A, B, C, and D. In order to provide the proper correction factors to the CRT with the beam at point 200, it is necessary to interpolate the correction signals provided at these fixed locations. This may be done by using the circuits represented by the block diagrams of FIGS. 9 and 10.

Figure 9:
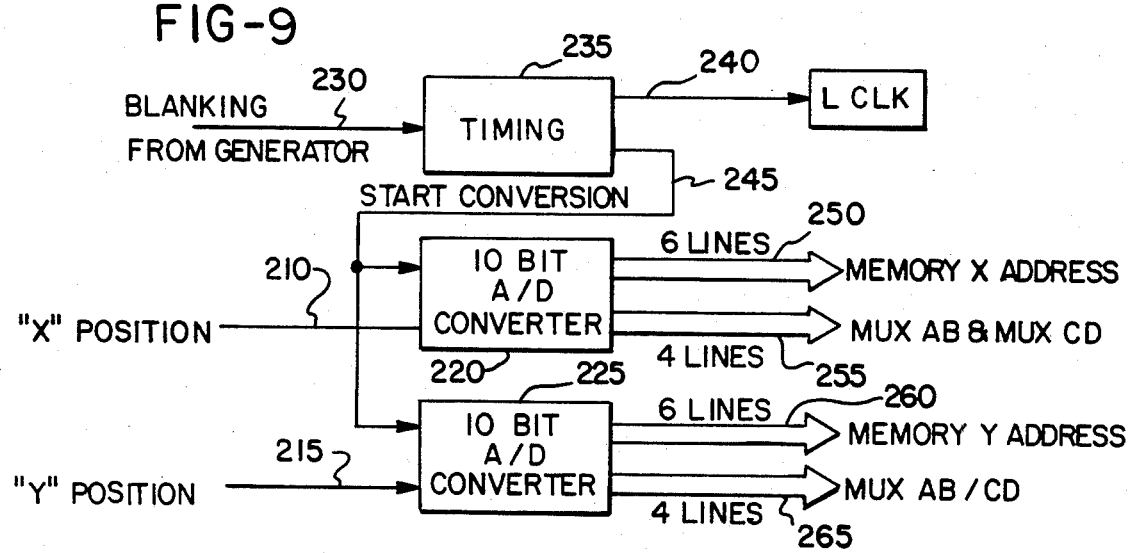
FIG. 9 is a block diagram of a control circuit used in connection with a calligraphic point-to-point display system, for providing digital address signals in response to the current position of the beam on the CRT.

In FIG. 9, analog signals from a point-to-point display control circuit representing the current position of the beam in an X and Y coordinate system are sent on lines 210 and 215 to respective analog-to-digital (A/D) converter circuits 220 and 225. A blanking signal on line 230 from the point-to-point display circuit is applied to the timing circuit 235, and this circuit produces two outputs, one of which provides the LCLK signals on line 240, and the other is a start conversion signal on line 245. The start conversion signal causes the A/D converters 220 and 225 to capture the current position of the beam and to generate corresponding digital address signals on lines 250, 255, 260 and 265. These address signals are used by the circuit shown in FIG. 10.

In the embodiment shown herein, each X and Y address is converted into a 10 line binary form. The six most significant data lines 250 and 260 from each converter 220 and 225 are applied as memory X and memory Y address signals to memory circuits MEM A, MEM B, MEM C and MEM D in FIG. 10 to select the correction factors for locations A, B, C and D, as shown in FIG. 8. These memory circuits contain the correction signals for all of the memory locations on the face of the CRT where correction factors have been recorded. These memory circuits are similar to the PROMs shown in FIGS. 2 and 7.

Figure 10:
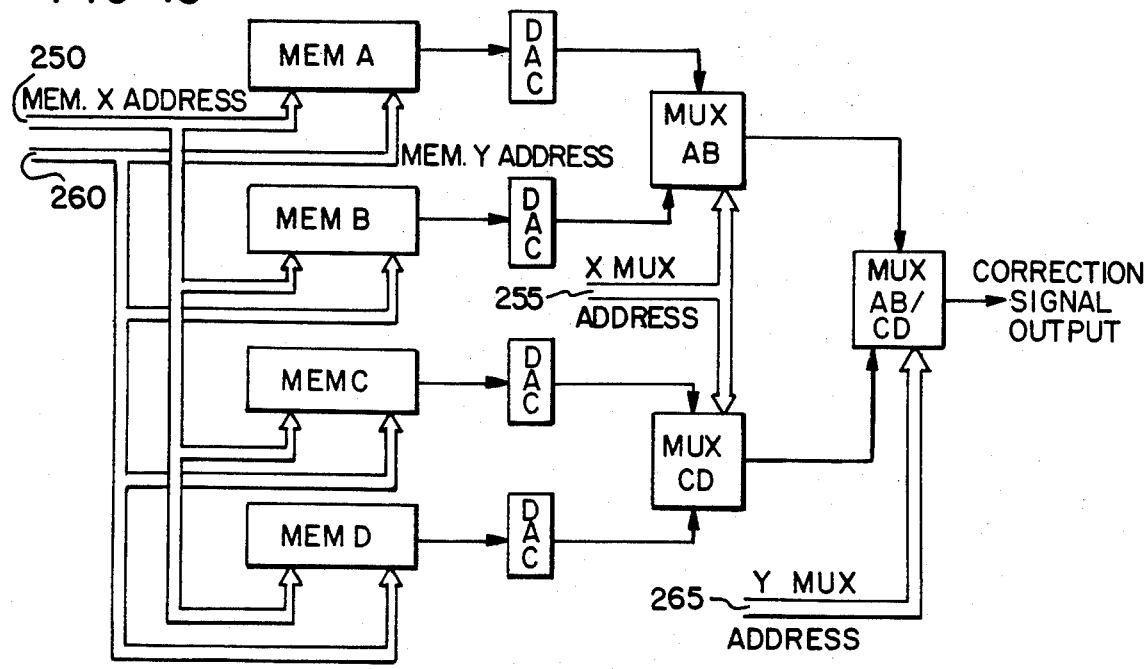
FIG. 10 is a block diagram of a circuit for generating beam correction signals in response to the digital address signals generated by the circuit of FIG. 9.

The four least significant data lines from each of the A/D converters 220 and 225 are used to address the multiplexer circuits MUX AB and MUX CD of FIG. 10. These two multiplexers perform an analog interpolation of the correction voltages from each of the DAC (digital-to-analog converters) connected to the outputs of each of the memory circuits MEM A–MEM D.

The analog outputs from the multiplexers MUX AB and MUX CD are applied as the inputs to multiplexer MUX AB/CD. This device performs an analog interpolation of these two outputs in accordance with the Y position of the beam to be displayed, under control of the Y address signal as presented on line 265. Each of the multiplexers shown in FIG. 10 perform the same function as the multiplexers 80 shown in FIGS. 2 and 7.

Thus, the same general principle of operation applies to a point-to-point display system as to a raster scan system, in terms of the interpolation of correction signals to be applied to the CRT in accordance with the relative position of the beam to fixed correction locations.

While the method herein described, and the forms of apparatus for carrying this method into effect, constitute preferred embodiments of this invention, it is to be understood that the invention is not limited to this precise method and forms of apparatus, and that changes may be made in either without departing from the scope of the invention, which is defined in the appended claims.

What is claimed is:

1. In a display system where correction factors for a beam have been recorded in memory for a limited number of preselected positions on the face of the display device, the method of providing correcting signals to the display device for all other positions on the face of the display device comprising the steps of
    determining the location where the beam is desired to be placed,
    selecting those memory locations containing recorded correction factors bordering the selected beam location,
    determining the position of the selected beam location relative to preselected memory locations, and
    means for interpolating the correction factors in accordance with their position relative to the selected beam position.

2. Apparatus for providing correction signals to the beam of a CRT in accordance with the location of the beam on the screen, said apparatus comprising
    memory means, said memory means including memory locations corresponding to a limited number of preselected locations on said screen where correction factors to the characteristics of the beam have been recorded,
    means for selecting the location where the beam is to be placed,
    means for selecting those memory locations bordering the beam, and
    means for interpolating the correction factors recorded in said selected memory locations in proportion to the proximity of the beam relative to the preselected locations where the correction factors were recorded in said memory means.

3. Apparatus for providing correction signals to the beam of a CRT in accordance with the location of the beam on the screen, said apparatus comprising
    a plurality of memory means, each of said memory means including memory locations corresponding to groups of preselected locations on said screen where correction factors to the characteristics of the beam have been recorded,
    means for selecting the location where the beam is to be placed,
    means for selecting those groups of memory locations in said memory means closest to the beam,
    means for selecting the specific memory location in each of said groups of memory locations bordering the beam, and
    means for interpolating the correction factors recorded in said selected memory locations in proportion to the proximity of the beam relative to the preselected locations where the correction factors were recorded in said memory means.

4. Apparatus for providing correction signals to the beam of a CRT in accordance with the location of the beam on the screen, said apparatus comprising
    first and second memory means, each of said memory means including memory locations corresponding to groups of preselected locations on said screen where correction factors to the characteristics of the beam have been recorded, and each of said memory means providing a digital word representing the correction factor assigned to each memory location,
    first and second digital-to-analog converter means responsive to the respective outputs of said first and second memory means for converting the digital words representing correction factors to appropriate voltage or current levels for making the desired correction,
    means for selecting the location where the beam is to be placed, said selecting means including a pixel clock, means for selecting those groups of memory locations in both said first and said second memory means bordering the beam, including, first counter means responsive to said line blanking interval signal for providing memory addresses to said first and second memory means, second counter means responsive to said pixel clock for determining on which line the beam is being written, means for selecting the specific memory location in each of said groups of memory locations closest to the beam, including third counter means responsive to said line blanking interval signal for providing additional memory address to said first and second memory means, and means for interpolating the correction factors recorded in said selected memory locations in proportion to the proximity of the beam relative to the preselected locations where the correction factors were recorded in said memory means, said combining means including a resistance ladder connected between said first and second digital-to-analog converter means, and a mulitplexer responsive to the output of said third counter means for combining the analog values of said correction signals.

5. The apparatus of claim 4 further including means for resetting said first counter means and said third counter means during the frame blanking interval, and means for resetting the second counter means during the line blanking interval.

6. Apparatus for providing correction signals to the beam of a CRT display system of the type where the beam is scanned across the face of the CRT in a raster fashion, a line at a time, and where corrections to selected characteristics of the beam at preselected locations on the face of the tube have been recorded in memory, said apparatus comprising first and second memory means, each of said memory means including groups of memory locations, each group containing the correction factors for preselected locations on a single scan line, means for determining the line on the screen where the beam is to be scanned, means for selecting those groups of memory locations in both said first and said second memory means bordering the line on which the beam is positioned, means for selecting the specific memory location in each of said groups of memory locations as the beam is scanned, and means for interpolating the correction factors recorded in said selected memory locations in proportion to the proximity of the line being scanned by the beam relative to those lines where the groups of correction factors are recorded in said memory means.

7. Apparatus for providing correction signals to the beam of a CRT in accordance with the location of the beam on the screen, said apparatus comprising a plurality of memory means, each of said memory means including memory locations corresponding to groups of preselected locations on said screen where correction factors to the characteristics of the beam or multiple beams have been recorded, the characteristics stored in memory are used to alter the size, intensity, shape or position of the beam or multiple beams and where different values may be stored for each of the multiple beams, means for selecting the location where the beam or multiple beams are to be placed, means for selecting those groups of memory locations said memory means bordering the beam, means for selecting the specific memory location in each of said groups of memory locations bordering the beam of multiple beams, and means for interpolating the correction factors recorded in said selected memory locations in proportion to the proximity of the beam or multiple beams relative to the preselected locations where the correction factors were recorded in said memory means.

8. Apparatus for providing correction signals to the beam of a CRT display system of the type where the beam is scanned across the face of the CRT in a point-to-point fashion, said apparatus comprising a plurality of memory means, each of said memory means including groups of memory locations each containing the correction factors for preselected X and Y coordinate locations, means responsive to the actual X and Y position of the beam for selecting said groups of memory locations containing the correction factors bordering the beam position, and means for interpolating the correction factors recorded in said selected memory locations in proportion to the proximity of the beam thereto.

* * * * *